United States Patent [19]

Singleton, Jr.

[11] 3,898,053

[45] Aug. 5, 1975

[54] BRAZING MATERIALS

[75] Inventor: Ogle Ridout Singleton, Jr., Richmond, Va.

[73] Assignee: Reynolds Metals Company, Richmond, Va.

[22] Filed: Aug. 5, 1974

[21] Appl. No.: 494,603

Related U.S. Application Data

[62] Division of Ser. No. 363,910, May 25, 1973, Pat. No. 3,853,547.

[52] U.S. Cl. .............................................. 29/197.5
[51] Int. Cl. ........................................... B32b 15/00
[58] Field of Search ............ 75/142, 148, 141, 146, 75/147; 29/197.5

[56] References Cited
UNITED STATES PATENTS 3,788,824   1/1974   Singleton, Jr. et al. ............ 29/197.5
3,811,177   5/1974   Schoer et al. ...................... 75/147 X

*Primary Examiner*—L. Dewayne Rutledge
*Assistant Examiner*—Arthur J. Steiner
*Attorney, Agent, or Firm*—Glenn, Palmer, Lyne & Gibbs

[57] ABSTRACT

An aluminum-silicon brazing composition containing about 0.02 to 0.20% bismuth by weight, with silicon in the range from about 7 to 14% and magnesium in the range from about 0.2 to 2%; preferably employed as a cladding layer on a magnesium-containing aluminum base core alloy.

9 Claims, No Drawings

BRAZING MATERIALS

This application is a division of prior copending application Ser. No. 363,910, filed on May 25, 1973, now U.S. Pat. No. 3,853,547.

This application concerns an improved aluminumsilicon brazing composition for joining aluminum alloy components, and containing about 0.02 to 0.20% bismuth by weight. The silicon content ranges from about 7 to 14%; and the composition also contains about 0.2 to 2% magnesium. In a particularly effective embodiment, this brazing composition is employed as the outer cladding layer on a higher strength aluminum alloy core component, preferably a core alloy of the type containing one or both of magnesium and manganese in amounts up to about 3% magnesium and up to about 1.5% manganese.

Aluminum-silicon alloys ahve been used previously for brazing, and those further containing magnesium have been used for vacuum brazing. An unsolved problem has been to find a brazing composition capable of tolerating pressure variations commonly encountered in commercial vacuum brazing operations, and effective at relative mild vacuums on the order of $10^{-4}$ or even $10^{-3}$ torr.

In accordance with the present invention it has been found that a brazing composition consisting essentially of aluminum, silicon, magnesium and bismuth, in the amounts previously noted, has especially desirable properties for purposes of vacuum brazing. That this result obtains is surprising an unexpected, because bismuth, although reported in the literature as being a helpful additional to Al-Si brazing compositions used in an inert-gas environment at atmospheric pressure, has exhibited a negative effect on the vacuum brazing behavior of Al-Si compositions which do not contain magnesium. Hence, there appears to be some sort of potentiating effect due to the presence of both bismuth and magnesium in Al-Si compositions of the type described herein.

In addition to the aforementioned major alloying elements, the brazing compositions of the present invention may include minor elements and impurities in amounts up to about 1% iron (pref. about 0.3% max.), 0.2% copper, 0.25% manganese, and 0.6% each of zinc (pref. 0.2% max.) and titanium (pref. .05% max.), with others not exceeding .05% each and 0.15% total.

The brazing material may be used as a separate component, such as a shim or in the form of wire or rod, but is preferably applied as the cladding on aluminum alloy components to be joined by vacuum brazing. The cladding may be on one or both sides of the core component, and typically constitutes from about 5% to about 15% of the composite thickness. Suitable core alloys include 3105, 3003, 3004, 5005, 5052 and 5457. Preferred core alloys are those containing 0.1 to 3% magnesium and up to about 1.5% manganese, typically about 0.3 to 0.8% manganese, balance aluminum and incidental impurities or minor alloying elements in amounts up to about 0.8% iron (typically 0.2 to 0.7%), 0.8% silicon (typically about 0.25 to 0.5%), 0.4% zinc, 0.35% chromium 0.4% copper, 0.1% titanium, with others not exceeding .05% each and 0.15% total. With respect to these core alloys a magnesium content of about 0.2 to 0.8% is usually sufficient, sometimes as little as 0.2 to 0.4% in connection with an alloy having a nominal composition of approximately 0.3% Mg and 0.4% each of silicon, iron and manganese.

EXAMPLES

The following examples illustrate the practice of the invention and its presently preferred embodiments:

EXAMPLE 1

The nominal chemistry for the four plant produced brazing sheets and surface oxide thicknesses are given in Table 1. The chemistry of laboratory produced composites and surface oxide thicknesses are given in Table 2.

TABLE 1

Plant Produced Alloys — Cladding Chemistry and Surface Oxide

| MD Alloy No. | Si % | Fe % | Mg % | Bi % | Core Alloy[a] | Oxide film Acet |
|---|---|---|---|---|---|---|
| 150[b] | 9.7 | 0.2 | 1.5 | — | 3003 | 65–105 |
| 176 | 9.7 | 0.2 | 1.5 | 0.1 | 3003 | ~130 |
| 177 | 9.7 | 0.2 | 1.5 | 0.1 | R396 | 105–210 |

[a] 3003 nominal 0.12% Cu, 1.2% Mn
R396 nominal 0.15% Cu, 0.2% Mn, 0.22% Mg
[b] X-7 brazing sheet (X4004 cladding)

TABLE 2

Laboratory Produced Alloys — Cladding Chemistry and Surface Oxide

| S Alloy No.[a] | Si % | Fe % | Mn % | Mg % | Zn % | Bi % | Ti % | Oxide film Acet |
|---|---|---|---|---|---|---|---|---|
| 29561 | 11.3 | 0.22 | 0.14 | <.01 | 0.01 | <.01 | 0.02 | 60–120 |
| 29562 | 11.1 | 0.30 | 0.12 | 0.33 | 0.01 | <.01 | 0.04 | 100–155 |
| 29563 | 11.2 | 0.30 | 0.12 | 0.34 | 0.01 | 0.10 | 0.04 | 130–200 |
| 29565 | 11.2 | 0.36 | 0.12 | 0.71 | 1.60 | <.01 | 0.04 | 125–190 |

[a] Core alloy RX606 nominal 0.4% Si, 0.4% Fe, 0.4% Mn, 0.3% Mg

TEST SPECIMENS AND EVALUATION

I. The Gap-Joint Specimen

An assembled, ready-for-brazing, gap-joint test specimen was prepared from 3003 fin stock ½ inch high so that seven nodes of fin stock support the brazing sheet specimens. A suitable length of 24 gage (0.0201 inches dia.) EC wire was placed centrally between the strips of brazing sheet to create a gap.

The brazing sheet to be tested was used as four strips 0.020 inches × ½ inches × 3 inches with a pair of holes 2 ½ inches apart, one of the holes being spaced - inch from an end. The four strips were then paired up, holes matching but ends not in registry. This arrangement permitted each pair of specimens to be held together by screws and yet provided endjoints.

The EC wire formed a gap in the ½ inch wide lap joint. This gap extended about ⅝ inch to either side of the wire; thus four, lap-joint gaps were provided each of which was similar to, but larger than, the gaps known to occur in production assemblies.

The main evaluation is the number of these 4 gaps which are sealed by brazing flow as a measure of the amount of flow which occurred in the gaps. The goal is to seal all four gaps during brazing.

II. The Three-Tiered Joint

Four pieces of brazing sheet ~1 ¼ inch square were separated by three rings of ⅞ inch old., 3003 tubing, ¼ inch high. The rings were cut-off with a lathe tool so as to have smooth paprallel ends. To make a vent, the upper ring was slotted 0.025 inch wide × ⅛ inch deep down from its top surface. A central ⅛ inch hole was punched in each sheet. The assembly was secured to an 0.010 inch thick, oxidized stainless steel carrier by a bolt extending axially through the assembly. The bolt head and carrier sealed the top and bottom holes; the holes in the middle plates were sufficiently large to vent the interior.

PROCEDURE

Brazing sheet was oiled if handled by hand. Prior to assembly, all components were solvent degreased in perchloroethylene. After solvent degreasing, gloves were used to avoid fingermarks (a possible joining variable) on the material.

The test specimen was mounted on a thin, stainless steel carrier. The carrier was attached to a ⅛ inch o.d. stainless steel sheathed, type K, thermocouple. The grounded junction occupied a position between the brazing sheet pairs of a gap joint. The sheathed thermocouple extended through an O-ring seal in the removeable furnace door.

The non-contact thermocouple was used to estimate specimen temperature. This method of temperature assessment was used because it was thought it would insure repeatability of both temperature and brazing results.

A typical brazing cycle consisted of the following steps:

1. Vent furnace to air; furnace hot zone at temperature.
2. Remove blank-off furnce door.
3. Slide specimen carrier into warm (300° to 500°F) zone of furnace, secure furnace door.
4. Pump furnace to desired vacuum and hold using throttling valve.
5. Using sheathed thermocouple as a push rod, insert sample into the hot zone.
6. Record thermocouple output, and system pressure during brazing cycle; continue to hold pressure with the throttling valve.
7. Arbitrarily, limit brazing cycle to 10 minutes.
8. Again, using the sheated thermocouple, withdrawn the specimen to the furnace warm zone.
9. When the thermocouple indicates less than 800°F, vent the furnace to air, remove the door with specimen carrier and brazed joint.
10. Replace blank-off door and pump down the furnace.

The brazed specimen was then cooled, removed from the carrier, sampled for surface chemistry, and evaluated visually.

The sole measure of brazing environment was pressure. Pressure was measured either with a NRC 527 ion gage and a 710 controller or a Hastings DV6 gage and meter. The environmental pressure was changed by throttling a gate valve to the vacuum pump. The pressure sources were such actual and virtual leaks as existed at a given time plus off-gassing particularly from the specimen and jig.

Surfaces were sampled for determination of post-braze oxide film thickness and surface magnesium. The gap-joint was always sampled on the top surface near an end. The three-tiered specimen was sampled on both inner and outer surfaces. Determinations were made using the electron microprobe. Oxide film thicknesses (Acet) were determined for the 0.020 inch (±.002 inch) clad sheets, and expressed in the Angstroms on the basis of counts for equivalent thickness relative to reference oxide films of known thickness on 99.99% aluminum.

RESULTS AND DISCUSSION

The following results are based on numerous vacuum brazing tests using the various brazing sheets. The objective of these tests was to rate each brazing sheet on the basis of its ability to seal gaps. Some alloys were also rated for joining in a closed member using the three-tiered joint test. For purposes of comparison, a torr (equal to 1 mm Hg) corresponds to a pressure of $10^3$ microns.

I. The Three, Plant-Produced MD Alloys
A Gap-Joint Tests

The three metallurgical development alloys were MD150, MD176, and MD177. On the basis of gap-joint test results obtained with these alloys MD176 and MD177 behaved quite similarly. At 40 to 50 microns, none sealed even one gap; surfaces after brazing were dull; all postbraze oxide thicknesses were over 300 Acet. None sealed 4 gaps in the 20–30 micron range; however, post-braze oxide values were reduced, particularly for MD177.

In the low micron pressure range, MD177 seemed more consistent in gap-filling ability and superior to MD176 in that respect. It is significant that MD177 is cored with magnesium-containing R396 alloy while MD176 is cored with 3003 which contains no magnesium. With three exceptions, the post-braze oxide film thicknesses were all under 150 Acet. when brazed at pressures under 12 microns. All three exceptions were with MD177.

The MD150 used came from formed, commercial evaporator plates except for three joints which came from an "accepted lot" used in other tests. MD150 appeared to function well only at a decade or decade and a half lower pressures than did MD177. That is, gap filling was erratic in the high $10^{-4}$ torr pressures and generally poor in the micron pressure range. This result is in good agreement with tests on full-size evaporators. Postbraze oxide thicknesses were similar to those obtained on the other alloys. With four exceptions, the thicknesses were under 150 Acet below 20 microns, ranged from 100 to >400 Acet in the 20 microns and were above 400 Acet at pressures in the 40 microns.

Only MD150 and MD177 were tested in the $10^{-5}$ torr range. As was expected, both alloys sealed all four gaps. The post-braze oxide-film thicknesses were 150 to 91 Acet for MD150, and below 50 Acet for MD177.

What appeared to be slight erosion of the core was encountered in MD177. Based on our laboratory experience with RX606, it was thought that erosion would not be a problem with an RX606 core, and that the erosion was due to the relatively high purity of R396.

B) Three-Tiered Joint Test

The three tiered joint test was concerned with fillet behavior on both the inside and the outside of the structure. Sealing of the vent slot was noted as another test observation. The results of testing MD150 and MD177 in this configuration are given in Table 3 below.

TABLE 3

Summary of Three-Tiered Joint Results

| MD Alloy | Brazing Pressure Torr | Exp. (a) | Temp. °F | Inner Fillet Rating (b) | Outer Fillet Rating (b) | Vent Slot |
| --- | --- | --- | --- | --- | --- | --- |
| 177 | 4.5–3 | –3 | 1110 | 1 | 1 | Sealed |
| 177 | 12–2 | –5 | 1110 | 1 | 1 | Sealed |
| 177 (c) | 12–3 | –5 | 1110 | 1 | 1,2 | Partially Filled |
| 150 (c) | 12–3 | –5 | 1110 | 5 | 1,2 | Open |

(a) exponent of 10
(b) 1, full, smooth continuous; 2, full, rough continuous; 3, small continuous; 4, slight skip; 5, skips
(c) the 3003 spacers were degreased but not chemically cleaned.

The surface chemistry of these samples was obtained on both inside and outside surfaces. These results are given in Table 4 which follows:

TABLE 4

Three-Tiered Joint Surface Chemistry

| MD Alloy | Brazing Pressure Torr | Exp. (a) | Oxide Film Thickness | | | Post-Braze Mg. | |
| --- | --- | --- | --- | --- | --- | --- | --- |
| | | | Before Acet | Inside Acet | Outside Acet | Inside % | Outside % |
| 177 | 4.5–3 | –3 | 105–210 | 390 | 44 | .69 | <.25 |
| 177 | 12–2 | –5 | 105–210 | 350 | 85 | .35 | <.25 |
| 177 (b) | 12–3 | –5 | 105–210 | 265 | 59 | .59 | <.25 |
| 150 (b) | 12–3 | –5 | 65–105 | 220 | 27 | .39 | <.25 |

(a) exponent of 10
(b) The 3003 spacers were degreased but not chemically cleaned.

The exterior surface chemistry was essentially that of the gap joints. The interior showed much thicker oxide films as have been found on other enclosed region specimens. There did not seem to be a correlation between surface chemistry inside the joint and filleting inside the joint, e.g., the MD150 had the thinnest, interior oxide film and the poorest fillets.

The foregoing results show the superior performance of MD177 in both the gap joint tests and in this test.

II. The Four, Laboratory Produced Alloys
A. Gap Joint Tests

The four laboratory produced alloys had brazing compositions containing 0 Mg; 0.3 Mg; 0.3 Mg + 0.1 Bi; and 0.7 Mg + 1.6 Zn.

Two major points are apparent from the results obtained. First, the addition of 0.1% bismuth to the 0.3 Mg alloy remarkably improved the gap filling ability of the alloy. In addition, the gap filling ability of brazing sheet having a 0.3 Mg + 0.1 Bi cladding on a magnesium containing core alloy (RX606) was equivalent to that of MD150 (1.5 Mg) on a 3003 core. Thus, the RX606 core apparently contributed to the improved vacuum-brazing performance of the laboratory alloys.

CONCLUSIONS

1. MD177 and MD176 offer improved brazeability over the present, commercial vacuum-brazing sheet X7 (MD150). That is, these materials produce brazing alloy flow that will seal gaps up to several microns pressure, a much poorer vacuum than MD150 will tolerate and still seal a gap.

2. The addition of 0.1% bismuth to aluminum-silicon-magnesium vacuum brazing alloys produced an improvement in pressure tolerance for gap-sealing flow which was so marked that it was unexpected.

3. The use of an alloy, such as R396 or RX606, which contains magnesium, improved the brazeability of the composite as compared to brazing sheet cored with 3003. The R396 core of MD177 showed signs of erosion in laboratory tests; RX606 core alloy has not evidenced erosion and thus would seem the better choice for a core alloy technically as well as economically.

What is claimed is:

1. A clad composite brazing sheet having a core and an outer cladding layer bonded to the core, wherein said cladding layer is composed of a brazing composition consisting essentially of aluminum, about 7 to 14% silicon, about 0.2 to 2% magnesium and about 0.02 to 0.20% bismuth, by weight, with minor elements and impurities in amounts up to about 1% iron, 0.2% copper, 0.25% manganese, 0.6% each in the case of zinc and titanium, others not exceeding 0.05% each and 0.15% total; and said core is composed of an alloy consisting essentially of aluminum, one or both of magnesium and manganese in amounts up to about 3% magnesium and up to about 1.5% manganese, by weight, with minor elements and incidental impurities in amounts up to 0.8% iron, 0.8% silicon, 0.4% zinc, 0.35% chromium, 0.4% copper, 0.1% titanium, others .05% each and 0.15% total.

2. The article of claim 1 wherein said core alloy contains about 0.3 to 0.8% manganese.

3. The article of claim 1 wherein said core alloy contains about 0.2 to 0.7% iron.

4. The article of claim 1 wherein said core alloy contains about 0.25 to 0.5% silicon.

5. The article of claim 1 wherein said core alloy contains about 0.20 to 0.8% magnesium.

6. The article of claim 1 wherein said core alloy contains approximately 0.3% magnesium and 0.4% each of silicon, iron and manganese.

7. The article of claim 1 wherein said cladding composition contains about 0.3% magnesium.

8. The article of claim 1 wherein said cladding composition contains about 1.5% magnesium.

9. The article of claim 1 wherein said cladding composition contains about 0.1% bismuth, about 0.3 to 1.5% magnesium and about 9 to 11% silicon.

* * * * *